US011305696B2

(12) United States Patent
Horne et al.

(10) Patent No.: US 11,305,696 B2
(45) Date of Patent: Apr. 19, 2022

(54) REARVIEW DEVICE AND VEHICLE WITH SUCH REARVIEW DEVICE (71) Applicant: SMR Patents S.à.r.l., Luxembourg (LU)

(72) Inventors: Steve Horne, Portchester (GB); Andrew Lettis, Portchester (GB); Graham Rehill, Portchester (GB); Andreas Herrmann, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/799,238

(22) Filed: Feb. 24, 2020

(65) Prior Publication Data
US 2020/0189471 A1 Jun. 18, 2020

Related U.S. Application Data (63) Continuation-in-part of application No. PCT/EP2018/071371, filed on Aug. 7, 2018.

(30) Foreign Application Priority Data

Aug. 25, 2017 (DE) .................. 10 2017 119 542.4
Jul. 29, 2019 (DE) .................. 10 2019 120 396.1

(51) Int. Cl.
*B60R 1/12* (2006.01)
*F21S 43/237* (2018.01)
(Continued)

(52) U.S. Cl.
CPC .......... *B60R 1/1207* (2013.01); *B60Q 1/2665* (2013.01); *F21S 43/14* (2018.01);
(Continued)

(58) Field of Classification Search
CPC ..... B60R 1/1207; F21S 43/237; F21S 43/249; F21S 43/14; F21S 43/19; F21S 43/245; F21S 43/27; B60Q 1/2665; B60Q 9/005
See application file for complete search history.

(56) References Cited

U.S. PATENT DOCUMENTS

2005/0052883 A1* 3/2005 Qi ........................... G09F 9/305
362/555
2006/0044523 A1* 3/2006 Teijido ................. G02B 6/0011
353/53
(Continued)

FOREIGN PATENT DOCUMENTS

EP 1304260 A1 4/2003
EP 2119595 A1 11/2009
(Continued)

OTHER PUBLICATIONS

International Search Report dated Sep. 26, 2018 of International application No. PCT/EP2018/071371.
(Continued)

*Primary Examiner* — Rajarshi Chakraborty
*Assistant Examiner* — Glenn D Zimmerman
(74) *Attorney, Agent, or Firm* — Jones Day (57) ABSTRACT An external rearview device for a motor vehicle includes a housing, and one or more of at least one light emitting or a receiving device, including one or more of at least one light producing device or at least one camera device arranged within the housing, and at least one at least partially transparent element closing an opening provided by the housing, the at least partially transparent element being provided in form of a first module attached to the housing, and the one or more of the light producing device or the camera device being provided in form of a second module attached to the
(Continued)

first module, the first module and the second module being mechanically releaseably coupled.

49 Claims, 7 Drawing Sheets

(51) Int. Cl.
*F21S 43/249* (2018.01)
*F21S 43/14* (2018.01)
*F21S 43/19* (2018.01)
*F21S 43/245* (2018.01)
*B60Q 1/26* (2006.01)
*F21S 43/27* (2018.01)
*B60Q 9/00* (2006.01)

(52) U.S. Cl.
CPC ............ *F21S 43/19* (2018.01); *F21S 43/237* (2018.01); *F21S 43/245* (2018.01); *F21S 43/249* (2018.01); *B60Q 9/005* (2013.01); *F21S 43/27* (2018.01)

(56) References Cited

U.S. PATENT DOCUMENTS

| | | | | |
|---|---|---|---|---|
| 2006/0133101 A1* | 6/2006 | Furtwangler | ............ | F21S 45/10 362/494 |
| 2006/0177182 A1* | 8/2006 | Mine | .................... | G02B 6/3825 385/74 |
| 2008/0238345 A1* | 10/2008 | Jaan | .................... | H05B 47/155 315/325 |
| 2010/0026475 A1* | 2/2010 | Hwang | .................. | B60Q 9/008 340/438 |
| 2011/0221588 A1* | 9/2011 | Foote | ..................... | B60R 1/081 340/465 |
| 2011/0260845 A1* | 10/2011 | Henion | ..................... | B60R 1/08 340/435 |
| 2013/0286664 A1* | 10/2013 | Wang | ..................... | F21V 13/02 362/341 |

FOREIGN PATENT DOCUMENTS

| | | | | |
|---|---|---|---|---|
| EP | 2151350 A1 * | 2/2010 | .......... | B60Q 1/2665 |
| EP | 2151350 A1 | 2/2010 | | |
| EP | 2463153 A1 | 6/2012 | | |

OTHER PUBLICATIONS

Written Opinion dated Sep. 26, 2018 of International application No. PCT/EP2018/071371.

European Search Report dated Jan. 19, 2022 of European application No. 212108161.1-1132.

* cited by examiner

REARVIEW DEVICE AND VEHICLE WITH SUCH REARVIEW DEVICE

CROSS-REFERENCE TO RELATED APPLICATIONS

This application is a continuation-in-part of International Patent Application No. PCT/EP2018/071371, filed Aug. 7, 2018, which claims the benefit of foreign priority to German Patent Application No. DE 10 2017 119 542.4, filed Aug. 25, 2017, each of which is hereby incorporated by reference in its entirety for all purposes.

BACKGROUND

1. Field of the Invention

The present disclosure relates to an external rearview device, in particular for a motor vehicle, including a housing, and at least one light emitting and/or receiving device, including at least one light producing device and/or at least one camera device arranged within said housing, and at least one at least partially transparent element closing an opening provided by said housing. Such rearview devices which are externally coupled to a vehicle body commonly include a reflective element to provide a rearview mirror element and/or a camera to provide an optical rearview apparatus. The present disclosure also relates to a vehicle with such a rearview device.

2. Related Art

Different functions and devices can be incorporated into and/or controlled with the help of rearview devices. Of particular interest are functions and devices to enhance, extend and/or sustain the functionality of the rearview device during normal or extreme conditions. This can comprise heating and/or cooling means, cleaning means such as wipers, liquid and/or gaseous sprays, actuator means for moving the rearview device or parts of it, such as for example a display, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore it can comprise linear tracks and/or rotating wheels, like for example a filter wheel, for exchanging optical elements, comprising for example lenses, mirrors, light sources, sensors, adaptive optics like deformable mirrors and/or filters.

Prominent examples for functions and devices incorporated into and/or controlled with the help of rearview devices comprise illumination devices, for example any kind of light module like an external light module, an internal light module, a front light, a back light, a fog light, a brake light, an acceleration light, a turn signal indicator, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rearview devices can comprise for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, comprising for example an ejection seat system, a direction indicator, a blind spot indicator, an approach system, a strong braking system, an emergency braking system, a charging status indicator, a vehicle mode system, comprising for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A monitoring device for vehicles, which has a housing and at least one mirror glass arranged in the housing so as to have a front side facing an observer, is known from U.S. Pat. No. 6,703,925. The at least one mirror glass has a reflective layer being reflective in the visible spectral range of light. At least one camera is arranged behind the reflective layer in a viewing direction viewed from the front side. The monitoring device can be used for driver identification, monitoring the driver's condition, identifying passengers and passenger positions, controlling airbags, theft surveillance, and similar purposes.

A camera module to be used in a rearview device can comprise a plurality of different optical elements, a.o. a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3. Further, the camera can comprise for example CCD or CMOS or light field sensors, as for example described in German patent application No. 102011053999. Also an area of the sensor can be reserved for different purposes, for example to detect a test beam, as described in U.S. Pat. No. 8,031,224. The camera module can also be equipped with apparatuses for light intensity adjustment as described for example in U.S. patent application Ser. No. 14/809,509 and light level intensifier tubes as described in U.S. patent application Ser. No. 09/771,140. Still further, the camera module or a cover adapted to the camera module can be moved using different actuators, drives and/or a flexible track, as for example described in German application No. 102016108247.3.

The camera module can also comprise cleaning elements to clean the optical element facing outwards and being exposed to the environment. The cleaning element can for example comprise wipers, brushes, lips, nozzles, fans and similar elements as are described in European patent application No. 14165197.6, European patent application No. 13163677.1, and European patent No. 1673260. The cleaning devices are not limited in composition, and may for example comprise any fabric, elastomeric, sponge, brush, or combination of these. Special wiper elements comprising wiper arms, wiper blades, wiping cloth, wiping tissue and combinations thereof are described in European patent application No. 14165197.6. A reservoir for holding a cleaning liquid is described in European patent application No. 14165197.6. Such a reservoir can be attached to or integrated into the camera module to provide the cleaning liquid to the optical elements of the camera module. Different methods may be used to detect dirt or other obscurations preventing or reducing the functioning of the camera module, such as described in U.S. Pat. No. 8,395,514, European patent No. 1328141, and U.S. Pat. No. 8,031,224. Also light sources can be installed or integrated into the camera module to increase the visibility of surrounding objects, measure distances and directions and detect dirt, such as described in U.S. Pat. No. 8,031,224, U.S. patent application No. 62/470,658, and U.S. patent application Ser. No. 09/771,140.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0.

A watertight seal against weather effects, as well as against the influence of washing processes with detergents, solvents and high pressure cleaners can be used on the housing of the camera module as described in U.S. patent application Ser. No. 13/090,127. Alternatively, the housing can be made of a body comprising plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0. Different types of fixings can be used to fix the camera module to the vehicle or other components, such as for example the snap-fit connection described in European patent No. 2233360.

Shape memory alloys (SMA) are used for various functions with rearview devices. European patent application No. 3098444 relates to an actuator device for a rearview device of a motor vehicle comprising: at least one retaining element; at least one adjusting element which can be transferred into a plurality of functional positions, in particular from a basic position into at least one end position; at least one driving means which comprises at least one shape-memory element which is, in particular, in the form of a wire, which extends between the retaining element and the adjusting element and can be or is secured to both, where the extension of said shape-memory element can be modified on being actuated, in particular on being electrically energized, and by means of the modification of the extension of which the at least one adjusting element can be transferred from one functional position into another functional position, in particular from the basic position into the end position or vice versa; at least one heat-conducting means which lies in contact with the driving means at least in the end position of the adjusting element; and wherein at least one switching means, by means of which the at least one driving means and the at least one heat-conducting means can be or are arranged with respect to one another with no contact in the basic position of the adjusting element and/or by means of which the at least one driving means and the at least one heat-conducting means can be or are arranged touching one another at least in sections at least in the end position of the adjusting element. A further actuator for an exterior rearview mirror of a vehicle is known from European patent application No. 2781743 and has at least one actuator pin, at least one drum body enclosing a cavity, in which the actuator pin can be arranged or is arranged in a non-rotational manner, at least one clamping means which comprises at least one shape-memory element which can be fixed or is fixed to the drum body and with which the drum body can be moved in a first rotational direction, and at least one return means which comprises at least one shape-memory element which can be fixed or is fixed to the drum body and with which the drum body can be moved in a second rotational direction, characterized in that the clamping means and/or the return means can be fixed or are fixed on a winding portion of the drum body and in the winding portion of the drum body at least quarter of a winding, in particular at least half a winding, in particular an entire winding, in particular several windings are applied.

It is also known to use a plastic substrate coated with a decorative coating as described in US application No. 2017/015802, the decorative coating including a spectrally controlling system and a stress controlling system. The desired optical effect will be a desired appearance for a surface, or a part of a surface, of a product (when viewed from the front) that includes a coated substrate in accordance with the present invention. The desired optical effect will be made up of a combination of a desired transmitted colour, a desired specular reflected colour, and a desired diffuse reflected colour, taking account of the combined influence of the decorative coating, the plastic substrate and the presence or not of backlighting. In this respect, the plastic substrate needs to be taken into account as the substrate may itself be tinted or clear, or may include embedded particles to provide the uncoated substrate with a hazy appearance, or may have one or both of its (uncoated) surfaces bearing a texture such as might be adopted to provide a "brushed-metal" appearance.

US patent application No. 2010/0177523 discloses optical fibres to be arranged externally on a housing of a rearview device, wherein the light for being coupled into these fibres is provided by a light source in the interior of the rearview device via holes in the housing. This known arrangement with the external optical fibres separate from the housing necessitates the optical fibres to be provided individually for each type of rearview device, i.e. individually for each vehicle type.

For the producers of vehicle components, it is generally desirable to use a modular arrangement. However, side turn indicator units need to be visible from the exterior and can thus not always be produced from parts that fit into vehicles of different design.

An LED module for use in a side turn indicator unit of a vehicle is generally mentioned in German patent application No. 101 44 451 A1.

From European patent application No. 2 471 688 A1, it is known to use a light emitting module for integrating a light source in a rearview device, wherein the light exits a housing of the device via an opening therein. US patent application No. 2010/0265739 discloses the use of a light emitting diode for providing the light of a side turn indicator. The light emitting diode has a dome-shaped end portion that is fitted into a hole in the housing of a rearview device, allowing the light to get to the outside of the housing. In both of these cases, water can enter into the housing, causing humidity therein, which can be detrimental to the durability of the electrical equipment therein, namely of the light emitting diode itself.

SUMMARY

In an aspect, an at least partially transparent element is provided in form of a first module attached to the housing, and in that the light producing device and/or the camera device is provided in form of a second module attached to the first module.

It is preferred that the first module provides at least one first contact surface facing to an interior side of said housing, preferably engaging at least one wall of said housing, at least one second contact surface facing to the second module, preferably engaging said second module, and at least one light exit surface facing to the outside of said housing in case the second module comprises the light producing device and/or at least one light entrance surface facing to the outside of said housing in case the second module comprises the camera device.

The first module can be formed with a main body and an extension, with preferably at least a portion of said main body acting as a lens that serves to focus or disperse light.

In one embodiment the main body provides a shoulder from which an arm forming the extension extends, and the arm provides a head at its free end, with the second module being arranged between the shoulder and the head.

In another embodiment the extension provides a recess or cavity into which the second module is at least partly inserted.

It is proposed that first module and the second module are mechanically coupled, preferably releaseably.

Embodiments of the invention can be characterized in that the housing comprises a casing with at least one wall and a bezel, with preferably the housing together with the first module providing a tight unit.

It is preferred that the second module is supported by the housing, in particular by the at least one wall and/or the bezel, preferably by the bezel.

According to one example of the rearview device, at least one reflective element, in particular in form of a mirror element, is fixed to the housing, preferably to the bezel, whereas according to another alternative the at least one reflective element is moveable relative to the housing.

Further, it is proposed that the first module, in particular its main body, protrudes from at least one outer surface of said housing, in particular over an imaginary contour line that connects the outer surface of the at least ones wall and the outer surface of the bezel.

Alternatively, the first module, in particular its main body, is flush with an outer surface of the housing.

The light producing device may include at least one light source, preferably a light emitting diode, and a body within which the light source is arranged.

The body can include a printed circuit board, a lower half and an upper half, with preferably the upper half being transparent, and/or the lower half being formed together with the printed circuit board, and/or the circuit board including at least one control unit for controlling said light source.

Still further the body can have at least one at least partially transparent portion, preferably provided by the upper half and/or engaging the first module.

According to another alternative, the light producing device can comprise at least one optical fibre for guiding light emitted from at least one light source to a, preferably dome-shaped, end portion which is coupled to the first module, preferably inserted into the recess or cavity.

It is also proposed that the light producing device comprises at least one light source having a dome-shaped exit surface coupled via a coupling element to at least one optical fibre, with preferably the coupling element having a H-shaped cross-section As a still further alternative, the light producing device can comprise at least one light source having a light exit surface provided by an inner protrusion surrounded by an outer ring-shaped wall for coupling to at least one optical fibre.

It is also proposed that a plurality of first modules is provided, with preferably each first module being coupled to a separate second module or to a common second module.

But there can also be a single first module which is coupled to a plurality of second modules and/or is provided with a plurality of light trunks for inputting or outputting light, with preferably each trunk being coupled to a separate second module or to a common second module.

Thus, the rearview device may include a housing in which at least one light producing device is arranged. The housing includes an at least partially transparent element that provides a contact surface facing to an interior side of said housing and an outer exit surface facing to the outside of said housing. "Transparent" means that for at least some of the wavelengths in the visible light frequency range, the light that enters the element also exits the element. "At least partially transparent" means that not necessarily, the entire element is transparent; it may have some opaque portions as well, e.g., at the edges. Adjacent to the contact surface of the at least partially transparent element, a part of the light producing device having a surface via which light exits the light producing device is arranged in such a manner that the exiting light is guided through the at least partially transparent element to the outer exit surface. Hence, all light producing elements can be arranged in the interior of the housing, and since an element of the housing itself is transparent or has at least transparent portions, no further elements need to be provided at the outside. Each car producing company can design an individual rearview device for each kind of vehicle, and it is only the transparent element as part of the housing which may need to be tailor-shaped for the rearview device's design. The remainder of the optical elements can be always of the same type. Higher numbers of such elements can be produced, which leads to lower overall costs.

In a preferred embodiment of the rearview device, the above-mentioned part of the light producing device is mechanically coupled to the at least partially transparent element. This allows for arranging the exit surface of the part and the contact surface of the transparent element rather close to each other, leading to a high coupling efficiency, i.e. a good rate of output intensity versus input intensity.

Preferably, the at least partially transparent element includes a shoulder from which a transparent arm extends on which a protruding head is provided, and the part of the light producing device is held between the protruding head and the shoulder. The transparent element itself thus provides for the mechanical coupling, no further elements such as screws, clips, and the like, would be needed.

In that embodiment, further preferably, a wall (specifically in the form of a bezel) of the housing abuts at least the part of the light producing device in order to provide for stably holding the entire light producing device in the housing.

In that embodiment of the rearview device, it is preferred as well that the light producing device includes a light source, preferably a light emitting diode, that is integrated in a body of said light producing device, wherein the body has an at least partially transparent portion, and the surface of the light producing device via which light exits same is a surface of said body. Hence, the light producing device can be provided as a very compact component, usable in different kinds of rearview devices.

In another preferred embodiment of the rearview device, the light producing device includes a light source to which an optical fibre is coupled, wherein an end portion of the optical fibre is coupled to the at least partially transparent element. This embodiment has the advantage that the light source can be arranged distant from the transparent element, at a suitable position in the interior of the housing, or alternatively, even outside of same (e.g., in the interior of the vehicle).

In that embodiment, further, preferably, the end portion of the optical fibre is dome-shaped and fits into a cavity in said at least partially transparent element. The rearview device can then be mounted very quickly.

In all embodiments hitherto mentioned, the at least partially transparent element can be shaped to protrude from at least one outer surface of the (remainder of the) housing. Then, the emitted light is most easily visible.

Alternatively, the at least partially transparent element is (with its outer surface) flush with an outer surface of the (remainder of the) housing. Then, the aerodynamic resistance of the vehicle is reduced, and the rearview device might be regarded as aesthetically appealing In all embodiments hitherto mentioned, the at least partially transparent element is preferably an element separate from (other) housing walls and can thus be most easily mounted, or later removed and placed.

It might be preferably for some purposes that the rearview device includes a plurality of at least partially transparent elements. The signalling can then be improved.

The at least partially transparent elements can each be coupled to another light producing device, providing for redundant and independent signalling.

The at least partially transparent elements can as well each be coupled to the same light producing device, which is economic.

In another aspect, a vehicle includes the rearview device described herein.

Further details of the first module comprising a transparent element to be used in a rearview device are described in the following:

A preferred transparent element, for use in a rearview device of a vehicle, has a body that forms a shoulder from which an arm extends, wherein on the arm, a head is provided that protrudes from the body to the same side as where the shoulder is formed, in order to enable holding of another element, namely the second module, between head and shoulder, the arm presenting a contact surface suited for coupling light exiting from such another element held between head and shoulder into said body. The body provides a further surface and is formed in such a manner that light coupled via the contact surface into the body exits same via the further surface. Such kind of transparent element can be used in the rearview device, that is, in a modular arrangement of components, when forming a housing of such rearview device. It might even be used in conjunction with different housing shapes.

Preferably, the body has at least a portion that acts as a lens that serves to focus or serves to disperse light on the path from the contact surface to the further surface. In other words, the transparent element is more than a mere light guide, but is a real optical lens-like element.

In the following, further details of the second module to be used in a rearview device in form of a light producing device are described:

A first light producing device includes a printed circuit board on which a light source, preferably a light emitting diode, is mounted, and the printed circuit board is held in a body having at least one transparent portion that provides (or presents) an exit surface via which light emitted from said light source can exit the light producing device. Hence, the light producing device can be produced as a very compact component, usable in different kinds of rearview devices.

Preferably, therein, the printed circuit board includes at least one control unit for controlling the light source in a manner to provide for a flashing indicator light. In other words, no external means needs to be used for providing a flashing light for an indicator, i.e. for causing the rearview device or only the module therein to act as a side turn indicator unit.

A second light producing device includes a light emitting diode having a dome-shaped exit surface coupled via a coupling element, that includes a H-shaped cross-section, to an optical fibre. Light emitting diodes with dome-shaped exit surfaces are known, and the dome-shape acts as a lens for directly emitting light. It is, however, difficult to guide light from such light emitting diode to another location. This is solved by a suitable coupling of the optical fibre.

A third producing device includes a light emitting diode having an exit surface with an outer ring-shaped wall and an inner protrusion, wherein an end portion of an optical fibre is held in said outer ring-shaped wall. Here, the diode itself provides for its own coupling element for the optical guide.

The second module is not restricted to light producing devices, but rather can either alternatively or in addition comprise camera devices.

BRIEF DESCRIPTION OF THE DRAWINGS

The present invention will be better understood from the following description of preferred embodiments which are described by way of example with respect to the schematic drawing, in which.

DETAILED DESCRIPTION

The term "rearview" is here defined as a view of the surrounding area, which is not in the field of view of a driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

Figure 1:
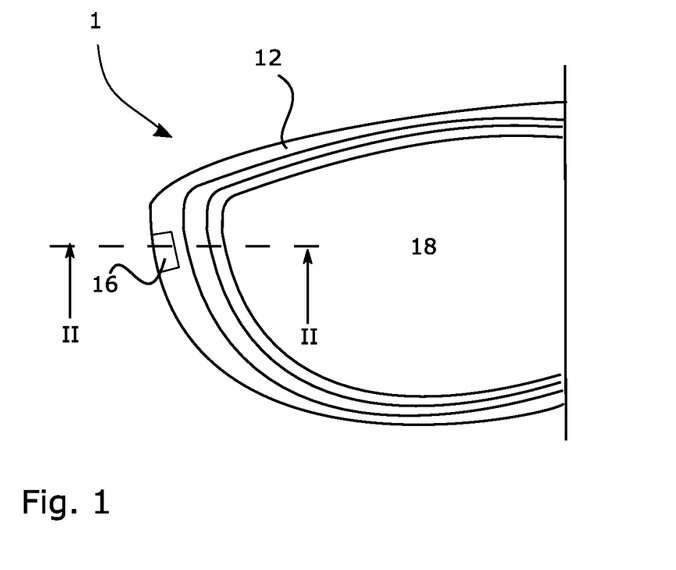
FIG. 1 shows a part front view of a rearview device according to a first embodiment.
Figure 2A:
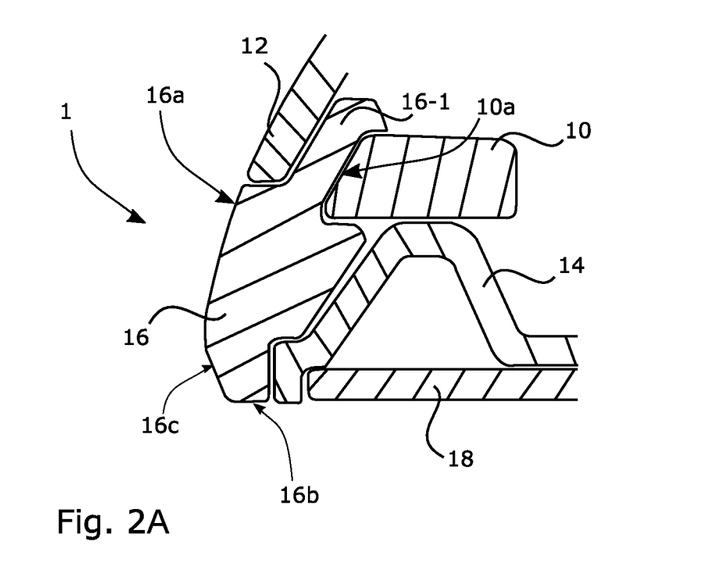
FIG. 2A shows a first example of the section II-II in FIG. 1.

FIG. 1 depicts a rearview mirror indicated at 1, being a rearview device according to a first embodiment. The rearview mirror 1 comprises a light producing device 10, arranged within a housing being made up of a hollow shell or casing a wall 12 of which is shown in the sectional view of FIG. 2A or FIG. 2B. In the example of FIG. 2A, part of the housing is also a bezel 14, in a known manner, wherein a transparent lens-like element 16 is arranged between the wall 12 and the bezel 14, to complement these two parts when forming the overall housing, preferably in manner for the housing to be tight. For instance, the transparent element 16 can be clamped between the wall 12 and the bezel 14. The transparent element 16 can be formed out of glass, or produced by moulding transparent plastic material, and in all examples herein is fully transparent, but could as well be only portion-wise transparent as long as its function explained hereinafter is fulfilled.

In the example of FIG. 1 with the cross-sectional example of FIG. 2A, the transparent element 16 has a first outer (exit) surface 16a that is flush with the outer surface of the wall 14. Further, there is a second outer (exit) surface 16b of the transparent element 16 that is flush with the front portion of the rearview mirror 1, namely an extremity of the bezel 14 and a mirror element 18 held by and in the bezel 14 wherein the mirror element 18 is fixed to the housing via the bezel 14. A third outer (exit) surface 16c of the transparent element 16 connects the first and second surfaces 16a and 16b providing a smooth, flattened edge, or corner, of the transparent element 16. The transparent element 16 has an arm 16-1 extending from a main body to engage on one side an inner surface of the wall 12 and on the opposite side the light producing device 10. In detail, the arm 16-1 is providing between a shoulder and hook-shaped head at the opposite side in order to hold the light producing device 10 there between. Since the bezel 14 also abuts against the light producing element 10, the same is stably held within the rearview mirror 1.

Figure 2B:
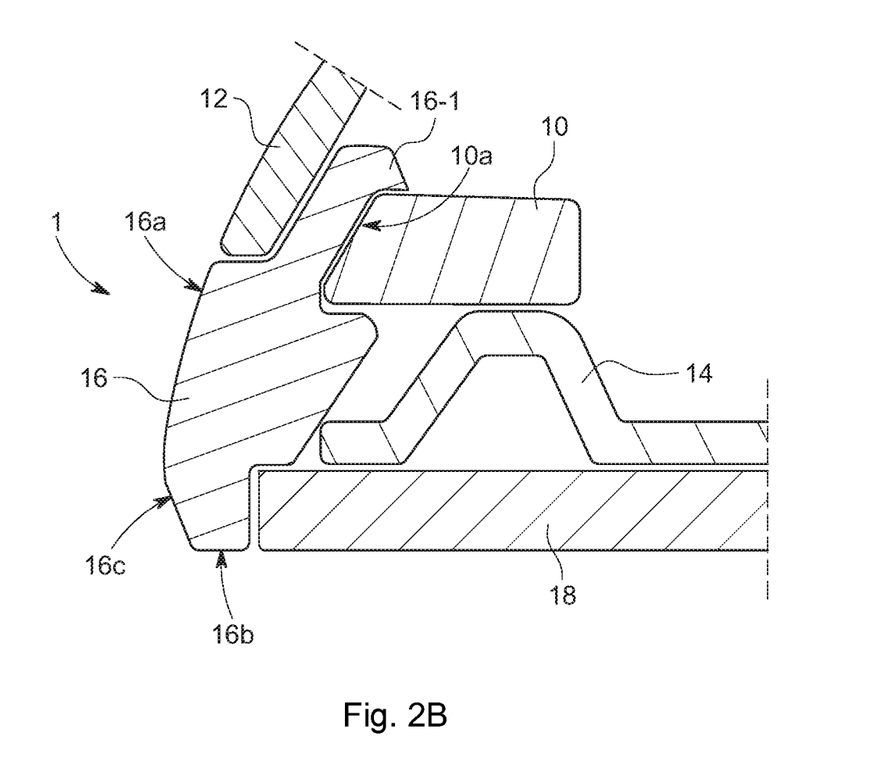
FIG. 2B shows a second example of the section II-II in FIG. 1.

In another example, a different cross-sectional view of the section II-II of FIG. 1 is illustrated in FIG. 2B. In this example, the bezel 14 acts as a mounting plate, without extending beyong the mirror element 18 such that the bezel 14 is not extending between the mirror element 18 and the transparent element 16. In this example, all other features are similar to the features described in reference with FIG. 2A but the bezel 14 is hidden behind the mirror element 18 rather than positioned between the mirror element 18 and the transparent element 16 as is the case with the FIG. 2A example.

The surface 10a of the light producing element 10 engaging the arm 16-1 is hold between said head and shoulder. The light producing element 10 is configured to emit light via, or through, said surface 10a to the exterior, and thus to couple that light into the arm 16-1. The arm 1-1 act as a light guide which is guiding at least a part of the in coupled light to the outer exit surface(s) 16a, 16b, 16c such that the light of the light producing element 10 can exit the housing through the transparent element 16.

The overall arrangement described with respect to FIG. 1 and FIG. 2A or 2B is suited to be built up from individual modules: one module for the light producing element 10, which can be the same for any kind of rearview mirror, and one module in the form of the transparent element 16, which can be individually fit and tailor-shaped for use in different kinds of housing and, thus, different rearview mirrors.

Figure 3:
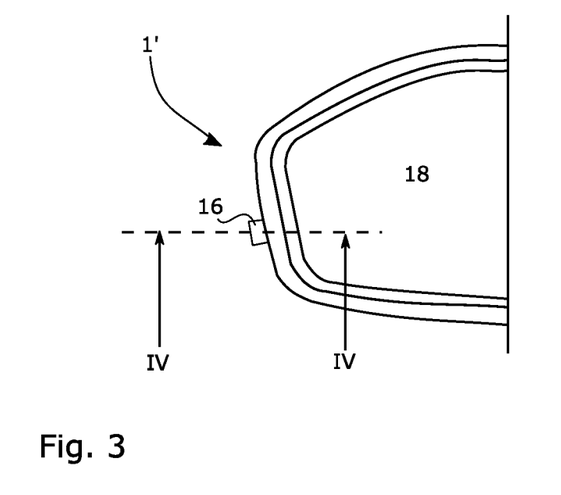
FIG. 3 shows a part front view of a rearview device according to a second embodiment.
Figure 4:
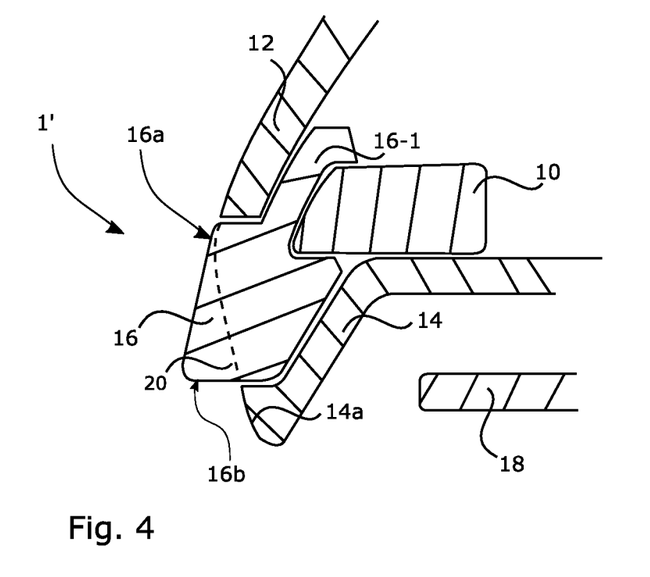
FIG. 4 shows the section IV-IV in FIG. 3.

A second embodiment of a rearview mirror 1' is shown in FIGS. 3 and 4. This second embodiment makes usage of a mirror element which can move relative to the housing, in contrast to the fixed mirror solution of the first embodiment. Therefore, the bezel 14 of the second embodiment has a bevelled portion, with a leg thereof terminating at a surface 14a, that faces to the lateral side of the rearview mirror 1' and does not engage the mirror element 18 in order to keep the mirror element 18 displaceable.

The transparent element 16 of the second embodiment is clamped between the wall 12 and the bezel 14, but it protrudes over an imaginary contour line 20 that would most naturally link the outer surfaces of the wall 12 and the outer surface 14a. It can be seen from the front view in FIG. 3 that the transparent element 16 protrudes over the general contour of the housing, in contrast to the flush solution of the first embodiment, see in particular FIG. 1.

Figure 5:
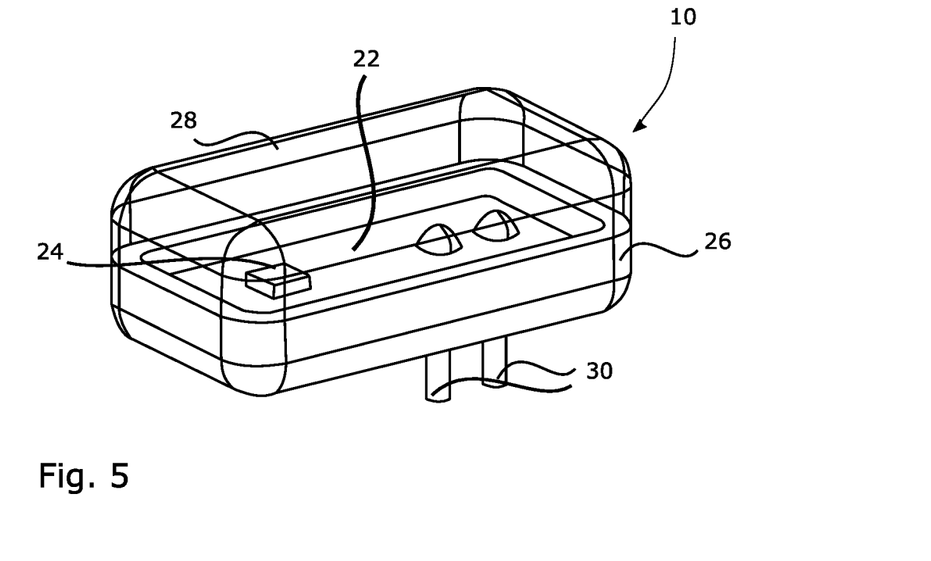
FIG. 5 shows a perspective view of a light producing device usable in the first or second embodiment of the rearview device.

In both rearview mirrors 1 and 1', the first as well as the second embodiment, the light producing device 10 is provided as a compact entity or unit and, thus, in form of a module as depicted in FIG. 5. At the heart thereof is a printed circuit board 22 that bears at least one light emitting device (LED) 24. The printed circuit board 22 is held in a lower half 26 of the light producing device 10 that is covered by an entirely transparent upper half (cover) 28. Ports 30 enable the supply of electrical energy to the printed circuit board 22. The printed circuit board 22 includes all elements necessary for controlling the LED 24, like a control unit and impedance matching elements (not shown). The LED 24 is suited for being intermittently operated (flashing) under such control, in order to provide a side turn indicator unit of the rearview mirror 1, 1'. Instead of using separable halves 26, 28, the printed circuit board 22 can be integral with the remainder of the body, such as can be obtained by moulding with, e.g., a resin.

Figure 6:
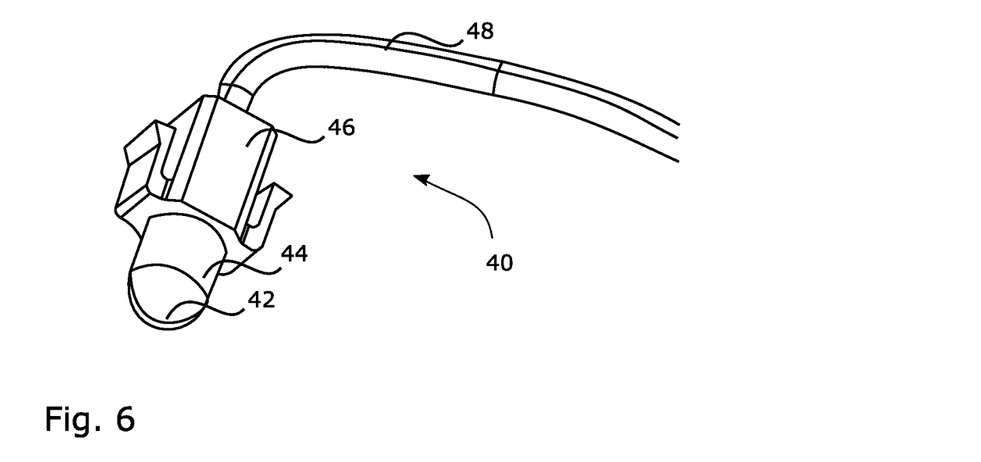
FIG. 6 shows a perspective view of components of another light producing device usable in a third or fourth embodiment.
Figure 9:
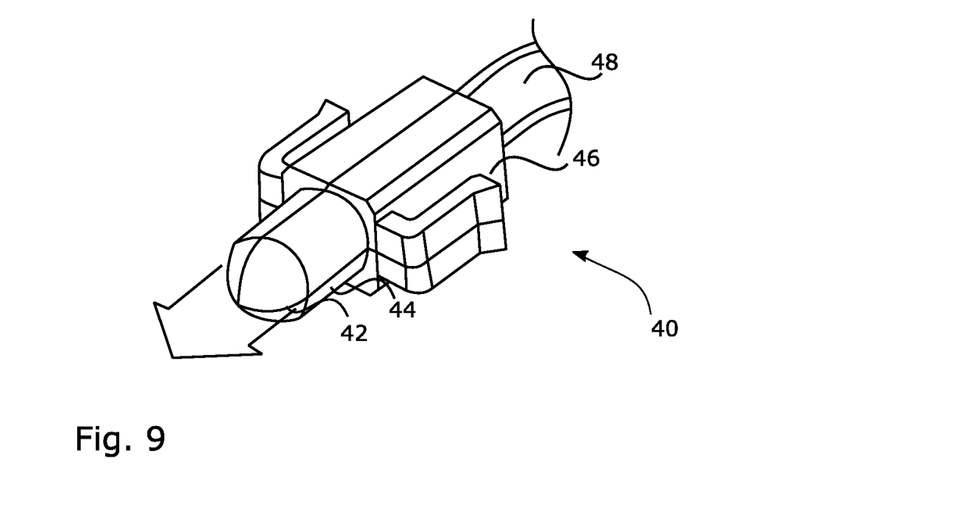
FIG. 9 shows another perspective view of the components according to FIG. 6.

FIGS. 6 and 9 show alternative light producing devices 40 to be used with a third and fourth embodiment of a rearview device 101', 101". Each one of said alternative light producing devices 40 is more or less bullet shaped. In both alternatives the light producing devices 40 are provided with at least one optical fibre 48 for guiding light emitted from a not shown LED to a pin 44 that terminates in a dome-shaped end portion 42. Fixing means 46 e.g. in form of clamping arms are optional.

Figure 7:
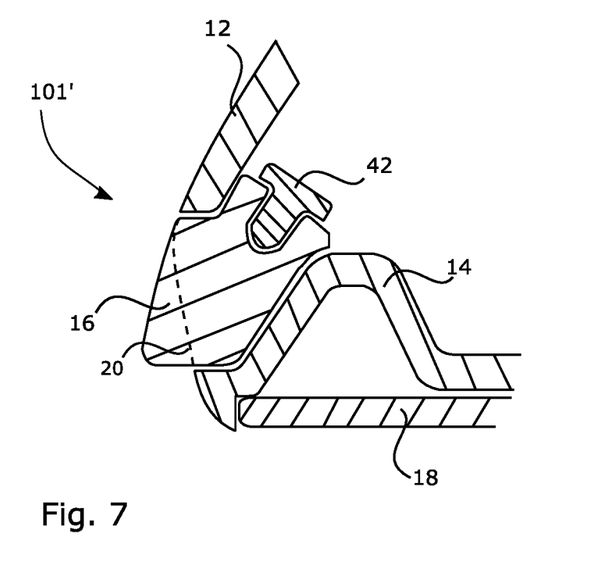
FIG. 7 shows a section such as in FIG. 2 of a rearview device according to the third embodiment.

FIG. 7 depicts the third embodiment incorporating a fixed mirror solution. The housing of the rearviewdevice 101' according to FIG. 7 makes usage of the elements 12, 14 already described with respect to FIG. 2. But the transparent element 16 of the third embodiment differs from the one shown in FIG. 2, by providing a cavity for accommodating the dome-shaped end portion 42 of the light producing device 40.

Figure 8:
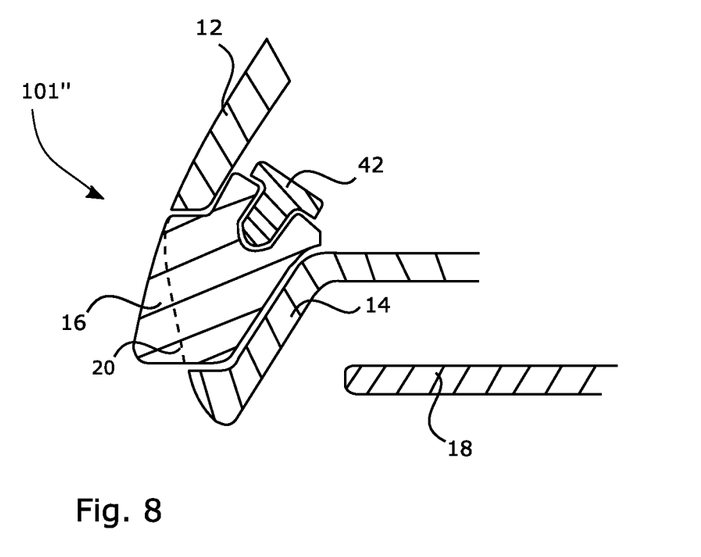
FIG. 8 shows a section such as in FIG. 4 of a rearview device according to the forth embodiment.

FIG. 8 depicts the forth embodiment incorporating a moving mirror solution. The housing of the rearviewdevice 101' according to FIG. 8 makes usage of the elements 12, 14 already described with respect to FIG. 4. But the transparent element 16 of the forth embodiment is provided with a cavity for accommodating the dome-shaped end portion 42 of the light producing device 40 in analogy to the third embodiment.

The transparent element 16 of the third as well as the forth embodiment protrudes over an imaginary contour line 20 as already described with reference to the second embodiment of FIG. 4.

In order to have light exiting the dome-shaped end portion 42, at least one LED needs to emit light into the light guiding optical fibre 48, shown in FIG. 6 or 9. A first variant of a respective light coupling is depicted in FIG. 10, and a second one in FIG. 11.

Figure 10:
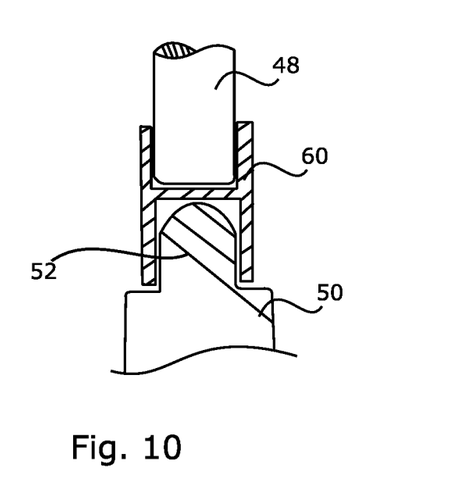
FIG. 10 shows a cross-section of a light emitting diode coupled in a first manner to an optical guide shown in FIG. 9.

FIG. 10 shows an LED 50 with a lens portion 52, enabling to fix a coupling element 60 of H-shaped cross section thereto. In detail, the coupling element 60 is provided with ring-shaped walls on two opposite sides to form the H-shape. While one side of the coupling element 60 engages the lens portion 52, the other one engages optical fibre 48 in an analogue manner.

Figure 11:
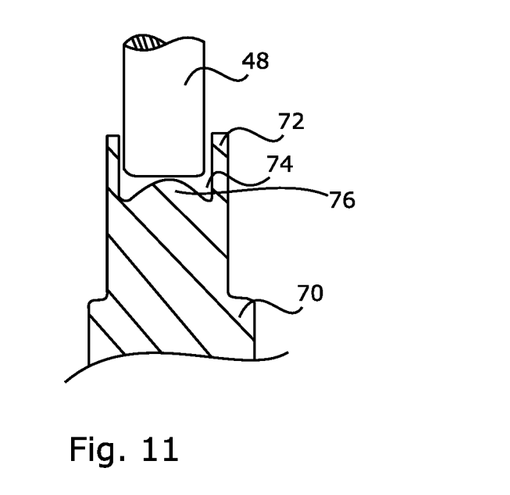
FIG. 11 shows a cross-section of a light emitting diode coupled in a second manner to an optical guide shown in FIG. 9.

FIG. 11 shows an LED 70 which itself is formed with a ring-shaped wall 72, surrounding a cavity 74 that in turn surrounds a convex protrusion 76 at an end portion of light emitting diode 70. The ring-shaped wall 72 allows the light guiding optical fibre 48 to be accommodated therein.

The four embodiments described so far all make usage of a single transparent element 16 co-operating with a single light producing device. It is also possible to use several transparent elements in one rearview mirror or to us one transparent element together with several light producing devices as shown in FIG. 12.

Figure 12:
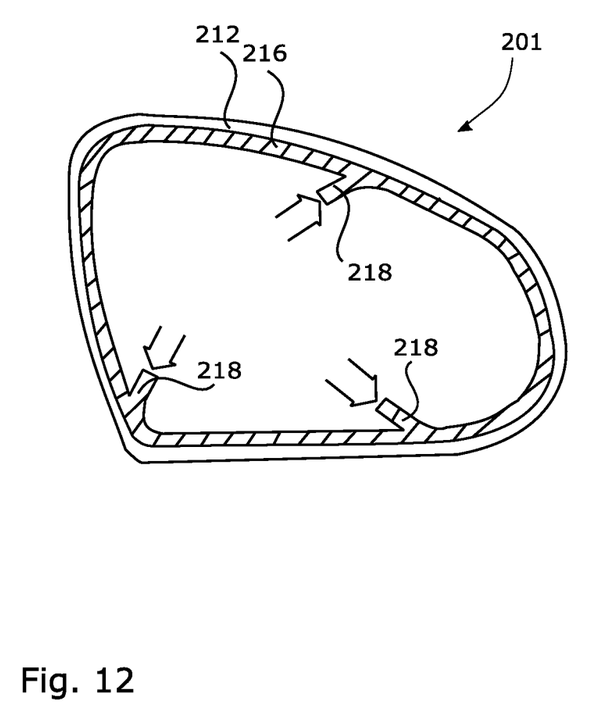
FIG. 12 shows a front view of a rearview device according to a fifth embodiment of the invention.

FIG. 12 shows a fifth embodiment of a rearview mirror 201, which makes usage of a more or less ring-shaped transparent element 216 following the contour of the wall 212 of the housing. Said transparent element 216 is formed with three input trunks 218 for light, with each of said trunks 218 being suited to be coupled to one common light producing device, like the light producing device 10 of FIG. 5. Alternatively, to each of the inputs 218, one optical fibre 48 as shown in FIG. 6 or 9 can be coupled, wherein the optical fibres receive light from one or more light sources, for instance LEDs. This allows the realization of a multitude of light effects. The transparent element 16 might not only assist in emitting light, but can also function as a bezel. It might even be transparent only in certain portions to allow for a plurality of design alternatives.

The features disclosed in the foregoing description, or the following claims, or the accompanying drawing, expressed in their specific forms or in terms of a means for performing the disclosed function, as appropriate, may, separately, or in any combination of such features, be utilized for realizing the invention in diverse forms thereof.

REFERENCE SIGN LIST 1, 1' Rearview device (mirror) for a vehicle
10 Light producing device
10a Contact surface of light producing device
12 Wall of housing
14 Bezel of housing
14a Surface of bezel 14
16 Transparent element
16-1 Arm of transparent element 16
16a, 16b, 16c Outer exit surface of transparent element 16
18 Mirror element of rearview device
20 Imaginary contour line
22 Printed circuit board
24 Light emitting diode
26 Lower half of body of light producing device 10
28 Upper half of body of light producing device 10
30 Contact ports of light producing device 10
40 Light producing device
42 Dome-shaped end portion
44 Pin
46 Fixing means
48 Optical fibre
50 Light emitting diode
52 Lens portion of light emitting diode 50
60 Coupling element
70 Light emitting diode
72 Ring-shaped outer wall at end portion of light emitting diode 70
74 Cavity
76 Convex protrusion at end portion of light emitting diode 70
101', 101' Rearview device (mirror) for a vehicle
201 Rearview device (mirror) for a vehicle
212 Wall of housing
216 Transparent ring
218 Light input trunks

What is claimed is:

1. An external rearview device for a motor vehicle, comprising:
   a housing; and
   one or more of at least one light emitting or a receiving device, comprising:
      one or more of at least one light producing device or at least one camera device arranged within the housing; and
      at least one at least partially transparent element closing an opening provided by the housing,
   wherein the at least partially transparent element is provided in form of a first module attached to the housing,
   the one or more of the light producing device or the camera device is provided in form of a second module attached to the first module, the first module and the second module being mechanically releaseably coupled,
   the first module is formed with a main body and an extension, and at least one of
      the main body provides a shoulder from which an arm forming the extension extends, and the arm provides a head at its free end, with the second module being arranged between the shoulder and the head, or
      the extension provides a recess or cavity into which the second module is at least partly inserted;
   wherein, the first module provides:
      a first light exit surface flush to the outside of the housing,
      a second light exit surface flush with a front portion of at least one of a display element or reflective element, and
      a third light exit surface connects the first light exit surface to the second light exit surface, and wherein the third light exit surface provides a smooth edge of the first module.

2. The rearview device according to claim 1, wherein the first module provides
at least one first contact surface facing to an interior side of said housing and engaging at least one wall of the housing, and
at least one second contact surface facing to the second module and engaging the second module.

3. The rearview device according to claim 1, wherein the housing comprises a casing with at least one wall and a bezel.

4. The rearview device according to claim 3, wherein the second module is supported by one or more of the at least one wall or the bezel, with the housing together with the first module providing a tight unit.

5. The rearview device according to claim 1, wherein at least one of the display element or reflective element, in form of a mirror element, is fixed to the housing.

6. The rearview device according to claim 3, wherein at least one of the display element or reflective element, in form of a mirror element, is fixed to the bezel, with the bezel at least one of supporting or embracing the said element.

7. The rearview device according to claim 3, wherein the first module protrudes from at least one outer surface of the housing over an imaginary contour line that connects the outer surface of the at least one wall and the outer surface of the bezel.

8. The rearview device according to any one of claims 1 or 6 wherein the first module is flush with an outer surface of the housing or the at least one of the display element or reflective element.

9. The rearview device according to claim 1, wherein the light producing device, comprises:
at least one light source comprising a light emitting diode; and
a body within which the light source is arranged.

10. The rearview device according to claim 6, wherein the body comprises a printed circuit board, a lower half, and an upper half, and
at least one of the upper half is transparent, the lower half is formed together with the printed circuit board, or the circuit board comprises at least one control unit for controlling the light source.

11. The rearview device according to claim 9, wherein the body has at least one at least partially transparent portion which is at least one of provided by the upper half or engaging the first module.

12. The rearview device according to claim 1, wherein the light producing device comprises at least one optical fibre for guiding light emitted from at least one light source to a dome-shaped end portion which is coupled to the first module.

13. The rearview device according to claim 1, wherein the light producing device comprises at least one light source having a dome-shaped exit surface coupled via a coupling element to at least one optical fibre, with the coupling element having a H-shaped cross-section.

14. The rearview device according to claim 1, wherein the light producing device comprises at least one light source having a light exit surface provided by an inner protrusion surrounded by an outer ring-shaped wall for coupling to at least one optical fibre.

15. The rearview device according to claim 1, wherein a plurality of first modules are provided, with each first module being coupled to a separate second module or to a common second module.

16. The rearview device according to claim 1, wherein a single first module is at least one of coupled to a plurality of second modules or provided with a plurality of light trunks for inputting or outputting light, with each trunk being coupled to a separate module or to a common second module.

17. A vehicle, comprising the external rearview device of claim 1.

18. An external rearview device for a motor vehicle, comprising:
a housing; and
one or more of at least one light emitting or a receiving device, comprising:
one or more of at least one light producing device or at least one camera device arranged within the housing; and
at least one at least partially transparent element closing an opening provided by the housing,
wherein the at least partially transparent element is provided in form of a first module attached to the housing,
the one or more of the light producing device or the camera device is provided in form of a second module attached to the first module, the first module and the second module being mechanically releaseably coupled,
the housing comprises a casing with at least one wall and a bezel, and
the first module protrudes from at least one outer surface of the housing; and
wherein, the first module provides:
a first light exit surface flush to the outside of the housing,
a second light exit surface flush with a front portion of at least one of a display element or reflective element, and
a third light exit surface connects the first light exit surface to the second light exit surface, and wherein the third light exit surface provides a smooth edge of the first module.

19. The rearview device according to claim 18, wherein the first module provides at least one first contact surface facing to an interior side of said housing and engaging at least one wall of the housing,
at least one second contact surface facing to the second module and engaging the second module.

20. The rearview device according to claim 18, wherein the first module is formed with a main body and an extension, and at least a portion of the main body acts as a lens that serves to focus or disperse light.

21. The rearview device according to claim 20, wherein the main body provides a shoulder from which an arm forming the extension extends, and
the arm provides a head at its free end with the second module being arranged between the shoulder and the head.

22. The rearview device according to claim 20, wherein the extension provides a recess or cavity into which the second module is at least partly inserted.

23. The rearview device according to claim 18, wherein the second module is supported by one or more of the at least one wall or the bezel, with the housing together with the first module providing a tight unit.

24. The rearview device according to claim 18, wherein at least one of the display element or reflective element, in form of a mirror element, is fixed to the housing.

25. The rearview device according to claim 18, wherein at least one of the display element or reflective element, in form of a mirror element, is fixed to the bezel, with the bezel at least one of supporting or embracing the said element.

26. The rearview device according to any one of claims 18, or 25 wherein the first module is flush with at least one of an outer surface of the hosing or the at least one of the display element or reflective element.

27. The rearview device according to claim 18, wherein the light producing device comprises:
at least one light source comprising a light emitting diode; and
a body within which the light source is arranged.

28. The rearview device according to claim 27, wherein the body comprises a printed circuit board, a lower half, and an upper half, and
at least one of the upper half is transparent, the lower half is formed together with the printed circuit board, or the circuit board comprises at least one control until for controlling the light source.

29. The rearview device according to claim 28, wherein the body has at least one at least partially transparent portion which is at least one of provided by the upper half or engaging the first module.

30. The rearview device according to claim 18, wherein the light producing device comprises at least one optical fibre for guiding light emitted from at least one light source to a dome-shaped end portion which is coupled to the first module.

31. The rearview device according to claim 18, wherein the light producing device comprises at least one light source having a dome-shaped exit surface coupled via a coupling element to at least one optical fibre, with the coupling element having a H-shaped cross-section.

32. The rearview device according to claim 18, wherein the light producing device comprises at least one light source having a light exit surface provided by an inner protrusion surrounded by an outer ring-shaped wall for coupling to at least one optical fibre.

33. The rearview device according to claim 18, wherein a plurality of first modules are provided, with each first module being coupled to a separate second module or to a common second module.

34. The rearview device according to claim 18, wherein a single first module is at least one of coupled to a plurality of second modules or provided with a plurality of light trunks for inputting or outputting light, with each trunk being coupled to a separate second module or to a common second module.

35. A vehicle, comprising the external rearview device of claim 18.

36. An external rearview device for a motor vehicle, comprising:
a housing; and
one or more of at least one light emitting or a receiving device, comprising:
one or more of at least one light producing device or at least one camera device arranged within the housing; and
at least one at least partially transparent element closing an opening provided by the housing,
wherein the at least partially transparent element is provided in form of a first module attached to the housing,
the one or more of the light producing device or the camera device is provided in form of a second module attached to the first module, the first module and the second module being mechanically releaseably coupled, and at least one of
the light producing device comprises at least one optical fibre for guiding light emitted from at least one light source to an end portion which is coupled to the first module, or
the light producing device comprises at least one light source having a dome-shaped exit surface coupled via a coupling element to at least one optical fibre with the coupling element having a H-shaped cross-section, or the light producing device comprises at least one light source having a light exit surface provided by an inner protrusion surrounded by an outer ring-shaped wall for coupling to at least one optical fibre; and
wherein, the first module provides:
a first light exit surface flush to the outside of the housing,
a second light exit surface flush with a front portion of at least one of a display element or reflective element, and
a third light exit surface connects the first light exit surface to the second light exit surface, and wherein the third light exit surface provides a smooth edge of the first module.

37. The rearview device according to claim 36, wherein the first module provides
at least one first contact surface facing to an interior side of said housing and engaging at least one wall of the housing,
at least one second contact surface facing to the second module and engaging the second module.

38. The rearview device according to claim 36, wherein the first module is formed with a main body and an extension, and at least a portion of the main body acts as a lens that serves to focus or disperse light.

39. The rearview device according to claim 38, wherein the main body provides a shoulder from which an arm forming the extension extends, and
the arm provides a head at its free end with the second module being arranged between the shoulder and the head.

40. The rearview device according to claim 38, wherein the extension provides a recess or cavity into which the second module is at least partly inserted.

41. The rearview device according to claim 36, wherein the housing comprises a casing with at least one wall and a bezel.

42. The rearview device according to claim 40, wherein the second module is supported by one or more of the at least one wall or a bezel, with the housing together with the first module providing a tight unit.

43. The rearview device according to claim 36, wherein at least one of the display element or reflective element, in form of a mirror element, is fixed to the housing.

44. The rearview device according to claim 36, wherein at least one of the display element or reflective element, in form of a mirror element, is fixed to the bezel, with the bezel at least one of supporting or embracing the said element.

45. The rearview device according to claim 41, wherein the first module protrudes from at least one outer surface of the housing over an imaginary contour line that connects the outer surface of the at least one wall and the outer surface of the bezel.

46. The rearview device according to any one of claims 36, or 44, wherein the first module is flush with at least one of an outer surface of the housing or the at least one of the display element or reflective element.

47. The rearview device according to claim 36, wherein a plurality of first modules are provided, with each first module being coupled to a separate second module or to a common second module.

48. The rearview device according to claim 36, wherein a single first module is at least one of coupled to a plurality of second modules or provided with a plurality of light trunks for inputting or outputting light, with each trunk being coupled to a separate second module or to a common second module.

49. A vehicle, comprising the external rearview device of claim 36.

* * * * *